US009201446B2

(12) United States Patent
Bowling et al.

(10) Patent No.: US 9,201,446 B2
(45) Date of Patent: Dec. 1, 2015

(54) TIMEBASE PERIPHERAL

(71) Applicant: Microchip Technology Incorporated, Chandler, AZ (US)

(72) Inventors: Stephen Bowling, Chandler, AZ (US); James Bartling, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 242 days.

(21) Appl. No.: 13/753,341

(22) Filed: Jan. 29, 2013

(65) Prior Publication Data

US 2014/0040654 A1   Feb. 6, 2014

Related U.S. Application Data

(60) Provisional application No. 61/593,435, filed on Feb. 1, 2012.

(51) Int. Cl.
*G06F 1/06* (2006.01)
*G06F 1/04* (2006.01)
*G06F 1/14* (2006.01)

(52) U.S. Cl.
CPC .. *G06F 1/06* (2013.01); *G06F 1/04* (2013.01); *G06F 1/14* (2013.01)

(58) Field of Classification Search
CPC ............. H03K 3/64; H03K 5/13; G06F 9/22; G06F 1/04; G06F 1/06; G06F 1/14; G01R 31/31922
USPC .......................................... 713/500, 501, 502
See application file for complete search history.

(56) References Cited

U.S. PATENT DOCUMENTS

| | | | | |
|---|---|---|---|---|
| 4,757,434 A | * | 7/1988 | Kawabata et al. | 363/41 |
| 4,928,171 A | * | 5/1990 | Kline | 348/64 |
| 5,365,183 A | | 11/1994 | Mitsuhira | 327/144 |
| 5,442,796 A | * | 8/1995 | Zastrow et al. | 712/36 |
| 5,471,608 A | | 11/1995 | Lee et al. | 713/502 |
| 5,475,621 A | * | 12/1995 | Lee et al. | 700/306 |
| 5,594,844 A | * | 1/1997 | Sakai et al. | 345/427 |
| 5,631,592 A | | 5/1997 | Schwarz et al. | 327/172 |
| 5,724,399 A | * | 3/1998 | Imakura | 377/16 |
| 5,900,025 A | * | 5/1999 | Sollars | 712/248 |
| 2002/0190768 A1 | * | 12/2002 | Bowling | 327/175 |
| 2008/0272836 A1 | * | 11/2008 | Smit et al. | 327/544 |
| 2011/0026664 A1 | * | 2/2011 | Castro Scorsi et al. | 377/54 |

OTHER PUBLICATIONS

International Search Report and Written Opinion, Application No. PCT/US2013/024032, 11 pages, Sep. 11, 2013.

* cited by examiner

*Primary Examiner* — Thomas Lee
*Assistant Examiner* — Chad Erdman
(74) *Attorney, Agent, or Firm* — Slayden Grubert Beard PLLC (57) ABSTRACT

A microcontroller has a programmable timebase, wherein the timebase has a trigger input to start a timer or counter of the timebase and wherein the timebase can be configured to operate upon receiving a trigger signal in a first mode to generate a plurality of timer/counter event signals until a reset bit in a control register is set and in a second mode to generate a single timer/counter event signal and wherein the timebase can be configured to operate in a third mode to generate a predefined number of timer/counter event signals, wherein the predefined number is defined by a plurality of bits of a register.

19 Claims, 5 Drawing Sheets

CCPxCON1 – CCPx CONTROL REGISTER 1

| R/W-0† | U-0 | U-0 | U-0 | R/W-0† | R/W-0† | R/W-0† | R/W-0† |
|---|---|---|---|---|---|---|---|
| OPSSRC | — | — | — | OPS3 | OPS2 | OPS1 | OPS0 |
| 31 | 30 | 29 | 28 | 27 | 26 | 25 | 24 |
| R/W-0† | R/W-0† | R/W-0† | R/W-0† | R/W-0† | R/W-0† | R/W-0† | R/W-0† |
| TRIGEN | ONESHOT | SYNCOSEL | SYNC4 | SYNC3 | SYNC2 | SYNC1 | SYNC0 |
| 23 | 22 | 21 | 20 | 19 | 18 | 17 | 16 |
| R/W-0† | R/W-0† | R/W-0† | R/W-0† | R/W-0† | R/W-0† | R/W-0† | R/W-0† |
| ON | FRZ | SIDL | SLPEN | TSYNC | CS2 | CS1 | CS0 |
| 15 | 14 | 13 | 12 | 11 | 10 | 9 | 8 |
| R/W-0† | R/W-0† | R/W-0† | R/W-0† | R/W-0† | R/W-0† | R/W-0† | R/W-0† |
| TPS1 | TPS0 | T32 | CCM | MOD3 | MOD2 | MOD1 | MOD0 |
| 7 | 6 | 5 | 4 | 3 | 2 | 1 | 0 |

CCPxCON2 – CCPx CONTROL REGISTER 2

| R/W-0† | U-0 | R/W-0† | R/W-0† | R/W-0† | R/W-0† | R/W-0† | R/W-1† |
|---|---|---|---|---|---|---|---|
| OENSYNC | — | OCFEN[(1)] | OCEEN[(1)] | OCDEN[(1)] | OCCEN[(1)] | OCBEN[(1)] | OCAEN |
| 31 | 30 | 29 | 28 | 27 | 26 | 25 | 24 |
| R/W-0† | R/W-0† | U-0 | R/W-0† | R/W-0† | R/W-0† | R/W-0† | R/W-0† |
| ICGSM1 | ICGSM0 | — | AOUTSEL1 | AOUTSEL0 | ICS2 | ICS1 | ICS0 |
| 23 | 22 | 21 | 20 | 19 | 18 | 17 | 16 |
| R/W-0† | R/W-0† | U-0 | R/W-0† | U-0 | U-0 | U-0 | U-0 |
| RSEN | ASDGM | — | SSDG | — | — | — | — |
| 15 | 14 | 13 | 12 | 11 | 10 | 9 | 8 |
| R/W-0† | R/W-0† | R/W-0† | R/W-0† | R/W-0† | R/W-0† | R/W-0† | R/W-0† |
| ASDG7 | ASDG6 | ASDG5 | ASDG4 | ASDG3 | ASDG2 | ASDG1 | ASDG0 |
| 7 | 6 | 5 | 4 | 3 | 2 | 1 | 0 |

CCPxCON3 – CCPx CONTROL REGISTER 3

| R/W-0† | R/W-0† | R/W-0† | R/W-0† | U-0 | R/W-0† | R/W-0† | R/W-0† |
|---|---|---|---|---|---|---|---|
| OETRIG | OSCNT2 | OSCNT1 | OSCNT0 | — | OUTM2[(1)] | OUTM1[(1)] | OUTM0[(1)] |
| 31 | 30 | 29 | 28 | 27 | 26 | 25 | 24 |
| U-0 | U-0 | R/W-0† | R/W-0† | R/W-0† | R/W-0† | R/W-0† | R/W-0† |
| — | — | POLACE | POLBDF[(1)] | PSSACE1 | PSSACE0 | PSSBDF1[(1)] | PSSBDF0[(1)] |
| 23 | 22 | 21 | 20 | 19 | 18 | 17 | 16 |
| U-0 | U-0 | U-0 | U-0 | U-0 | U-0 | U-0 | U-0 |
| — | — | — | — | — | — | — | — |
| 15 | 14 | 13 | 12 | 11 | 10 | 9 | 8 |
| U-0 | U-0 | R/W-0† | R/W-0† | R/W-0† | R/W-0† | R/W-0† | R/W-0† |
| — | — | DT5[(1)] | DT4[(1)] | DT3[(1)] | DT2[(1)] | DT1[(1)] | DT0[(1)] |
| 7 | 6 | 5 | 4 | 3 | 2 | 1 | 0 |

TIMEBASE PERIPHERAL

CROSS-REFERENCE TO RELATED APPLICATIONS

This application claims the benefit of U.S. Provisional Application No. 61/593,435 filed on Feb. 1, 2012, which is incorporated herein in its entirety.

TECHNICAL FIELD

The present disclosure relates to a timebase peripheral unit, in particular to a timebase peripheral with improved trigger mode.

BACKGROUND

Figure 1:
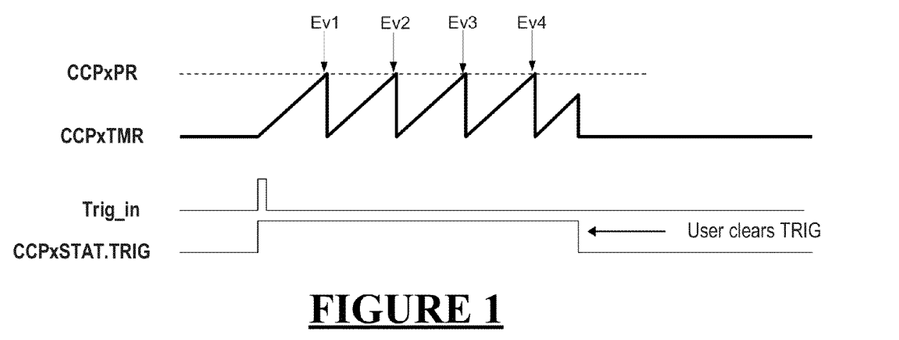
FIG. 1 shows a timing diagram of a timebase peripheral device operating in a first mode according to various embodiments.
Figure 2:
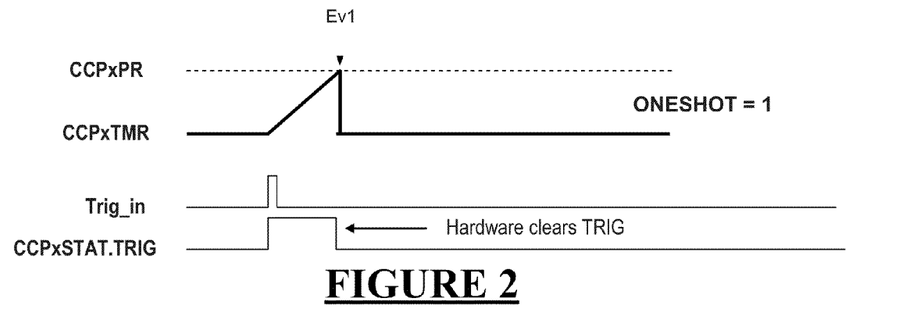
FIG. 2 shows a timing diagram of a timebase peripheral device operating in a second mode according to various embodiments.

Microcontrollers (MCU) comprise a microprocessor, memory and a plurality of peripherals, wherein some peripherals may be configured to operate independently from the MCU. A typical MCU generally comprise a programmable timebase in form of a timer as one of such peripherals. Such a timer can be programmed to provide for a trigger signal for system functions. A typical MCU timebase peripheral is designed to operate as a continuously running timer. This feature is generally implemented so that the timebase peripheral can provide complex triggering for other system functions. Often, that functionality is placed within the destination function. A conventional 16-bit timebase, for example, may have a trigger mode with a one-shot capability as shown in FIG. 2. The trigger mode uses an external signal to tell the timebase when to start. The timebase is held in reset until triggered. FIG. 1 shows a first mode of a conventional timebase, in which a trigger signal starts the timer. The timer then runs indefinitely and generates event signals until a user clears a bit CCPxSTAT.TRIG which causes the timer to stop. FIG. 2 shows a one-shot mode which operates differently. In this mode, the timebase will stop after the generation of the event.

SUMMARY

There exists a need for a method and system for an improved timebase.

According to an embodiment, a microcontroller may comprise a programmable timebase, wherein the timebase comprises a trigger input to start a timer or counter of the timebase and can be configured upon receiving a trigger signal to operate in a first mode to generate a plurality of timer/counter event signals until a reset bit in a control register is set and in a second mode to generate a single timer/counter event signal and wherein the timebase can be configured to operate in a third mode to generate a predefined number of timer/counter event signals, wherein the predefined number is defined by a plurality of bits of a register.

According to a further embodiment, the plurality of bits can be bits of the control register. According to a further embodiment, the control register can be a first control register and the plurality of bits can be bits of a second control register associated with the timebase. According to a further embodiment, the first mode can be set by setting a first mode bit and the second mode can be set by setting a second mode bit. According to a further embodiment, the first and second bit can be bits of a third control register associated with the timebase. According to a further embodiment, the third mode can be set by setting said second mode bit and setting the plurality of bits to a value >0. According to a further embodiment, the timebase can be a capture compare pulse width modulation (CCP) unit or a multiple output CCP (MCCP) unit.

According to an exemplary embodiment, a microcontroller may comprise a programmable timebase, wherein the timebase comprises a trigger input to start a timer or counter of the timebase and wherein the timebase can be configured to operate upon receiving a trigger signal in a first mode to generate a plurality of timer/counter event signals until a reset bit in a control register is set and in a second mode to generate a single timer/counter event signal and wherein the timebase can be configured to operate in a third mode to generate a predefined number of timer/counter event signals, wherein the predefined number is defined by a plurality of bits of a register.

According to a further embodiment, the plurality of bits can be bits of the control register. According to a further embodiment, the control register can be a first control register and the plurality of bits are bits of a second control register associated with the timebase. According to a further embodiment, the first mode can be set by setting a first mode bit and the second mode can be set by setting a second mode bit. According to a further embodiment, the first and second bit may be bits of a third control register associated with the timebase. According to a further embodiment, the third mode can be set by setting the second mode bit and setting the plurality of bits to a value >0. According to a further embodiment, the microcontroller may further comprise a capture compare pulse width modulation (CCP) unit or a multiple output CCP (MCCP) unit. According to a further embodiment, the timebase comprises a comparator coupled with a timebase counter and a period register. According to a further embodiment, the timebase further may comprise a one-shot logic unit operable to control the timebase to generate a single event signal upon receipt of a trigger signal, wherein the event signal is delayed with respect to the trigger signal by a predefined value stored in the period register. According to a further embodiment, the timebase may further comprise a counter operable to control the timebase to generate a predefined number of event signals upon receipt of a trigger signal, wherein each a time period between events is defined by a value stored in the period register and the number of event signals defined by said counter. According to a further embodiment, the microcontroller may further comprise logic to generate a plurality of predefined control signals for each event.

According to another embodiment, a method for generating event signals by means of a timebase in a microcontroller which can operate in at least one of three modes, may comprise: when operating in a first mode:—upon receiving a trigger input, starting a timer or counter of the timebase and generating a plurality of timer/counter event signals until a reset bit in a control register is set; when operating in a second mode:—upon receiving a trigger input, generating a single timer/counter event signal; and when operating in a third mode:—upon receiving a trigger input, generating a predefined number of timer/counter event signals, wherein the predefined number is defined by a plurality of bits of a register.

According to a further embodiment of the method, the first mode can be set by setting a first mode bit and the second mode can be set by setting a second mode bit. According to a further embodiment of the method, the third mode can be set by setting said second mode bit and setting the plurality of bits to a value >0. According to a further embodiment of the method, the event signal can be generated by comparing a value of a timebase counter with a period value stored in a register. According to a further embodiment of the method, the single event signal in the second mode can be controlled by a one-shot logic unit operable to control the timebase to generate a single event signal upon receipt of a trigger signal, wherein the event signal is delayed with respect to the trigger signal by a predefined value stored in the period register. According to a further embodiment of the method, a counter may count the number of event signals to limit the generation of event signals. According to a further embodiment of the method, the method may further comprise generating a plurality of predefined control signals for each event. According to a further embodiment of the method, when operating in the third mode, a capture compare unit can be controlled to store a plurality of capture values. According to a further embodiment of the method, when operating in the third mode, a capacitive time measurement unit can be controlled to capture a plurality of time measurements. According to a further embodiment of the method, when operating in the third mode, an analog-to-digital converter can be controlled to store a plurality of converted values. According to a further embodiment of the method, when operating in the third mode, a direct memory access controller can be controlled to perform a plurality of data transfers. According to a further embodiment of the method, a CPU of the microcontroller can be in a low power sleep mode when the timebase generates event signals.

BRIEF DESCRIPTION OF THE DRAWINGS

FIG. 5 shows a module block diagram for different compare modes.

DETAILED DESCRIPTION

A one-shot mode only allows one cycle. Some apps however may desire multiple cycles. For example, to perform a number of ADC conversions, e.g. eight, at, e.g., 100 μsec intervals when a trigger input is received. In another example, when a trigger input is received, for example, 3 pins may be triggered in sequence. In yet another example, 4 DMA writes to a serial port may be scheduled when a trigger is received.

Figure 4:
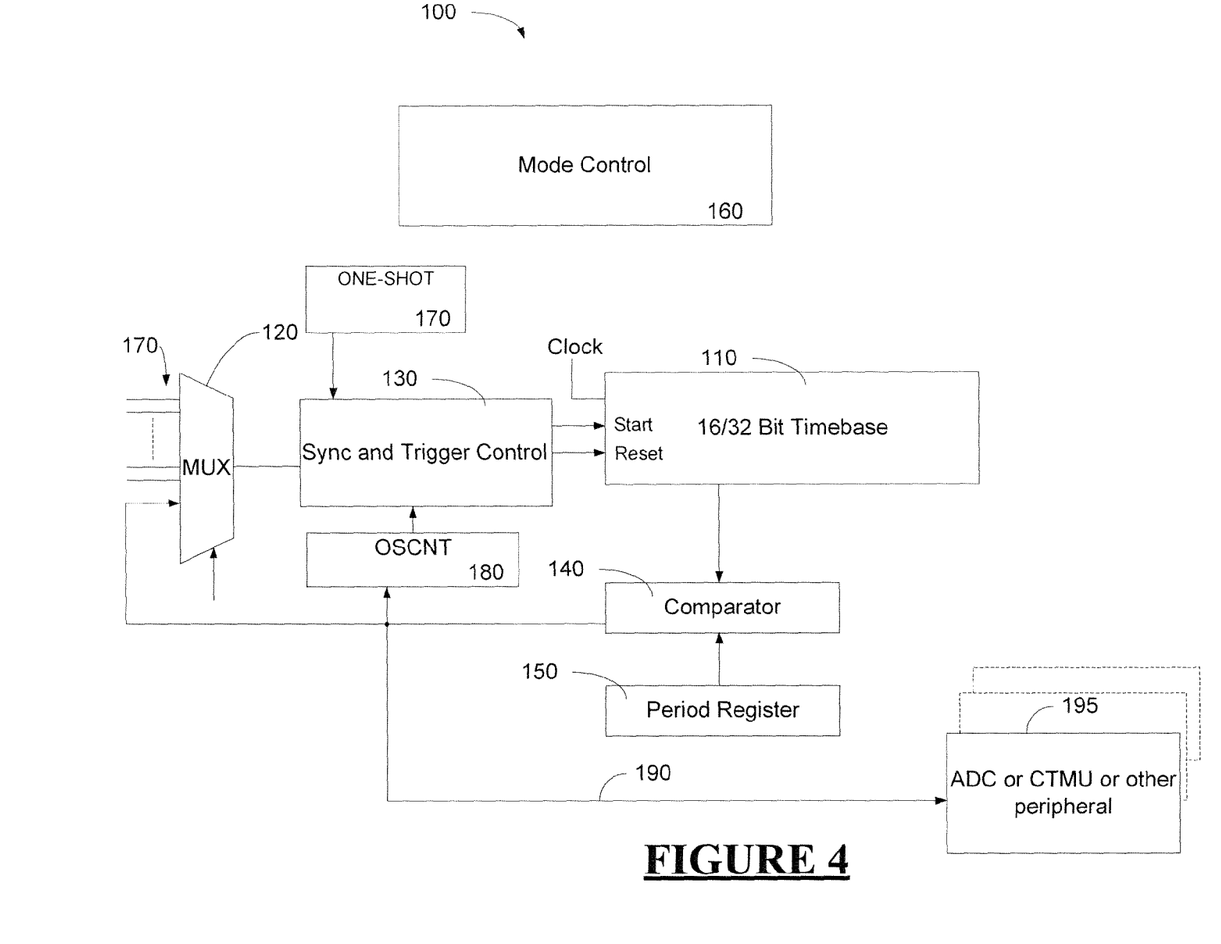
FIG. 4 shows a block diagram of a timebase according to various embodiments.

To be able to perform such flexible multi-event functions, according to various embodiments, a counter is added to the timebase to extend the one-shot mode for N cycles as shown in FIG. 4. The exemplary timebase peripheral 100 shown in FIG. 4 comprises a 16 or 32 bit timebase counter 110 which is controlled by a sync and trigger control unit 130. Sync and trigger control unit 130 may receive a plurality of sync signals 170 that may come from internal or external sources. A comparator 140 is coupled with the timebase counter 110 and a period register 150 to generate an event signal 190. Event signal 190 may also be fed back to multiplexer 120, for example to reset counter 110. Furthermore, a one-shot unit 170 is provided that may either directly control timebase counter 110 or as shown in FIG. 4 be coupled with the sync and trigger control unit 130. An additional counter 180 receives the event signal 190 and furthermore provides control signals to sync and trigger control unit 130. Again counter 180 may also directly control timebase counter 110. Also, according to other embodiments, the control signals provided by one-shot unit 170 and/or counter 180 may be fed to multiplexer 120. As shown in FIG. 4, a mode control unit 160 is provided for generating respective control signals to control multiplexer 120 and all other units of timebase 100 as necessary. For a better overview these connections are not depicted in FIG. 2.

Figure 3:
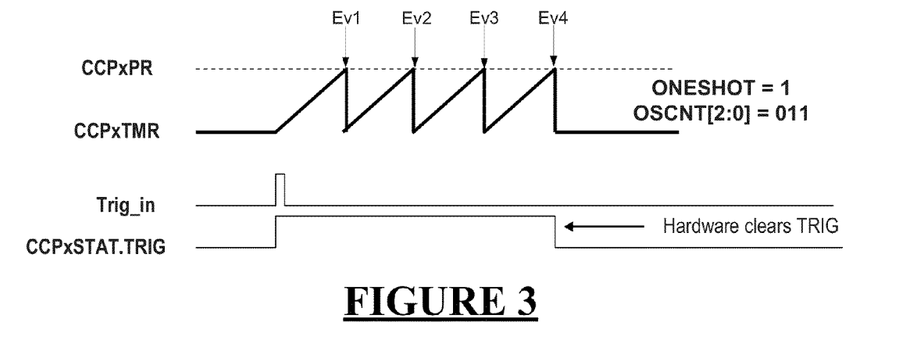
FIG. 3 shows a timing diagram of a timebase peripheral device operating in a third mode according to various embodiments.

The timebase 100 as shown in the exemplary embodiment in FIG. 4 may operate in three different modes as shown in FIGS. 1-3. In a first mode, once timebase counter 110 is started an undefined number of sequential event signals 190 will be generated. The only way to stop these sequential event signals is to reset the timebase 100 by software or manually. In a second mode, as shown in FIG. 2, a trigger generates a single shot event. In other words once the counter 110 is triggered a single event signal 190 is generated after which one-shot unit 170 resets the time base to wait for another trigger. In a third mode, additional counter 180 is preset to a predefined value. To this end, a preset register may be provided or integrated into counter unit 180. After a trigger has been received through multiplexer 120, the timebase counter 110 generates a plurality of sequential event signals as shown in FIG. 3. Each time an event signal is generated, counter 180 is decremented. Once counter 180 generates an overflow, the system 100 is reset and again will wait for another trigger. The function of down counter 180 as explained above can also be generated by an up counter in combination with a comparator and associated register.

According to various embodiments, an output compare peripheral may cause to automatically trigger an external measurement for a predetermined number of times, for example, three times, so that the MCU could remain in Sleep mode to conserve power. According to various embodiments, the measurement can be conducted by pulsing three device output pins with the output compare peripheral and then measuring a time delay on a fourth input pin. Without this feature, the MCU would need to wakeup and run code between each measurement, causing additional power consumption.

By providing the one-shot and event counting function within the timebase peripheral, it can act as a generic, flexible trigger source for any other peripheral or external system. The event counter 180 enables the timebase peripheral to generate multiple periodic events 190 from a single hardware event 170, saving both CPU overhead and power consumption. The various embodiments can be used to automate periodic events such as ADC conversions and inductive position sensing or trigger a capacitive time measurement unit as indicated by peripheral devices 195. Other trigger destination could be used and the trigger event 190 can be distributed within the device via multiplexers or drivers if necessary. The multiple events can occur while the CPU is in Sleep mode, saving power consumption.

As stated above, according to various embodiments, a timebase peripheral 100 comprises an event counter 180. The event signal can be a single event signal or may be further processed to generate a plurality of subsequent dependent event signals to perform an action. When a trigger signal is received, the timebase peripheral 100 will repeat such an action for a specified number of times. Thus, the various embodiments can help to automate sensing applications so that other components of the device (microcontroller) can stay in Sleep mode for a longer time to save power. This may be very important for battery powered applications such as metering, physical fitness devices, etc.

As shown in FIG. 4, an additional counter OSCNT 180 is provided, which may according to one embodiment provide for 3 bits. However, other configurations may be used. The timebase 100 has a trigger function that allows an external signal 170 to start the timebase counter 110. The timebase will be held in reset until a trigger pulse Trig_in is received. Under normal operation, the timebase will start counting and will remain counting until the trigger is cancelled in software as explained above and shown in FIG. 1. The trigger is cancelled by clearing the TRIG status bit in an associated special function register.

In the one-shot mode as shown in FIG. 2, the timebase will count through one count period, then reset and stop. The one-shot mode allows the user to create a single delay or pulse based on a hardware signal event.

According to the mode shown in FIG. 3, the OSCNT[2:0] bits (one-shot count) further extends the capability of the one-shot mode. If three bits define the additional counter, then up to eight events can be created. Thus, when the OSCNT bits are set to a non-zero value, the timer will count for multiple periods, and then stop. The OSCNT value specifies the number of count periods to extend the one-shot event. If OSCNT=011 b, the timebase will count for four periods, then reset and stop. This is shown in the timing diagram of FIG. 3.

The various embodiments have the advantages to reduce software overhead of fast, 'burst' tasks that would otherwise be needed and to be able to automate peripherals in Sleep to reduce power consumption.

FIG. 5 shows control registers that may be used to control the various functions of a timebase according to various embodiments, for example, in a 32-bit microcontroller. Hence, each register is configured as a 32-bit register. Other embodiments may use more or less registers wherein not all functions need to be provided to allow operation as discussed above.

Figure 6:
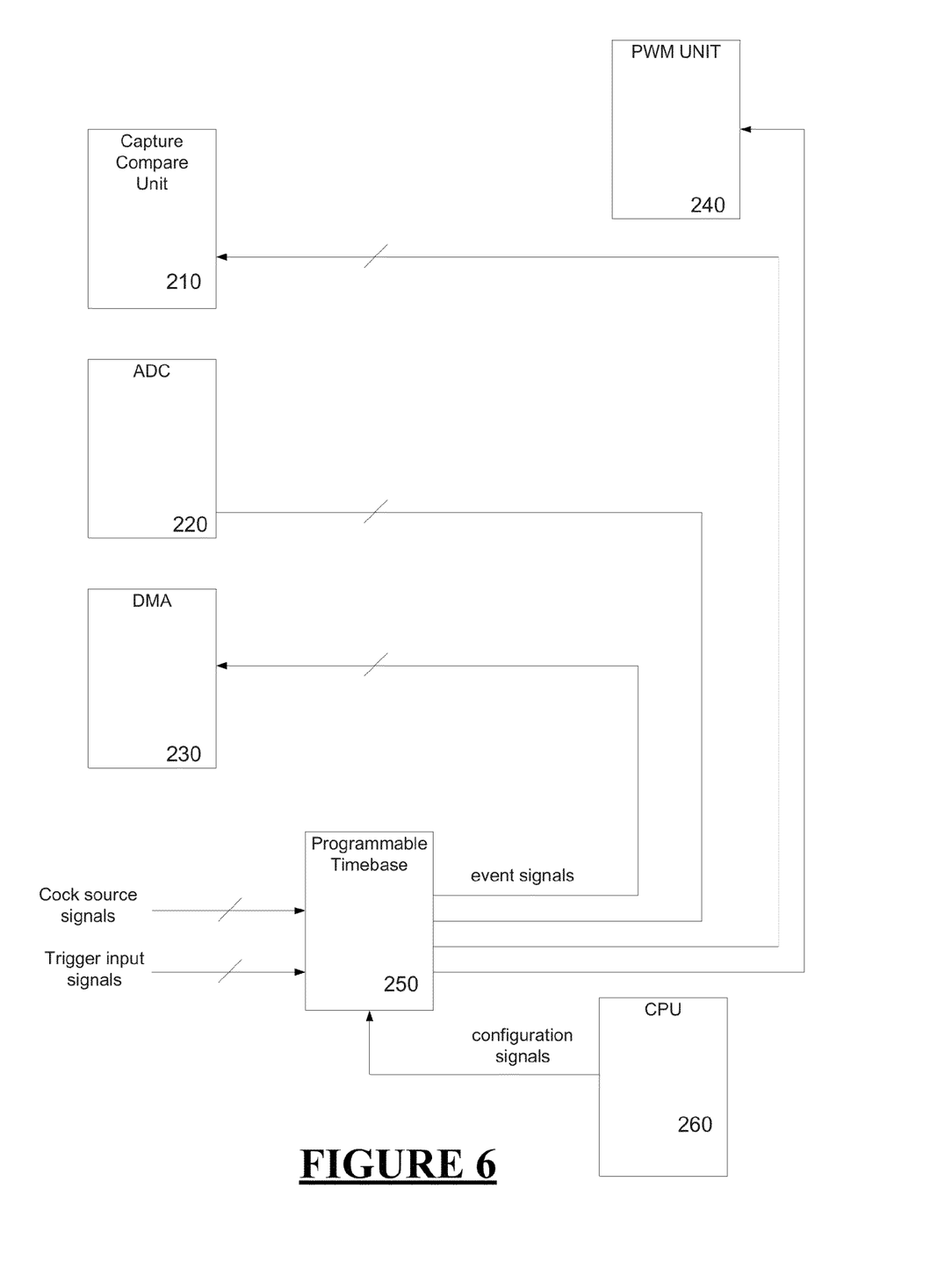
FIG. 6 shows another block diagram of certain elements in a microcontroller according to an embodiment.

As can be seen in the following function description, the control registers of the timebase can be designed to provide for a plurality of functions. The following bits of the CCPx control register 1-3 provide for the following functionality:

bit 31 OPSSRC: Output Postscaler Source Select bit
   1=Output postscaler scales module trigger output events
   0=Output postscaler scales timebase interrupt events
   This Control bit may have no function in Input Capture modes.

bit 30-28 Unimplemented: Read as '0 bit 27-24 OPS[3:0]: Capture/Compare/PWM Interrupt Output Postscale Select bits
   1111=Interrupt CPU every 16th timebase period match
   1110=Interrupt CPU every 15th timebase period match
   0100=Interrupt CPU every 5th timebase period match
   0011=Interrupt CPU every 4th timebase period match or after 4 input capture events
   0010=Interrupt CPU every 3rd timebase period match or after 3 input capture events
   0001=Interrupt CPU every 2nd timebase period match or after 2 input capture events
   0000=Interrupt CPU after each timebase period match or each input capture event bit 23 TRIGEN: CCPx Trigger Enable bit
   1=Trigger operation of timebase is enabled
   0=Trigger operation of timebase is disabled bit 22 ONESHOT: One-Shot Mode Enable bit
   1=One-shot trigger mode enabled; trigger duration set by CCPxCON3.OSCNT[2:0]
   0=One-shot trigger mode disabled bit 21 SYNCOSEL: Synchronization Output Select bit
   1=An alternate signal is used as the module synchronization output signal (see Table 2-1)
   0=The module synchronization output signal is the Timebase Reset/Rollover event bit 20-16 SYNC[4:0]: Capture/Compare/PWM Synchronization Source Select bits
   11111=Timebase is in the free running mode and rolls over at FFFF
   11110=Timebase is synchronized to source #30
   00001=Timebase is synchronized to source #1
   00000=Timebase self-synchronized and rolls over at FFFF or match with period register bit 15 ON: Module Enable bit
   1=Module is enabled with operating mode specified by MOD[3:0] control bits
   0=Module is disabled bit 14 FRZ: Freeze in Debug Mode bit
   1=When emulator in Debug mode, module freezes operation
   0=When emulator in Debug mode, module continues operation
   Note: FRZ is 'U-0' in operational mode and 'R/W-0' in Debug mode.

bit 13 SIDL: Stop in Idle Mode bit
   1=Discontinue module operation when device enters Idle mode
   0=Continue module operation in Idle mode bit 12 SLPEN: Sleep Mode Enable bit
   1=Module continues to operate in Sleep modes
   0=Module does not operate in Sleep modes bit 11 TSYNC: Timebase Clock Synchronization bit
   1=Module timebase clock is synchronized to internal system clocks; timing restrictions apply
   0=Module timebase clock is not synchronized to internal system clocks
   Note: This control bit has no function when the clock source selected by CS[2:0] is derived from, and synchronous with, the system clock source.

bit 10-8 CS[2:0]: Capture/Compare/PWM x Clock Select bits
   111=clk_in[7]
   1 10=clk_in[6]
   101=clk_in[5]
   100=clk_in[4]
   011=clk_in[3]
   010=clk_in[2]
   001=clk_in[1]
   000=Timebase clock is TCY bit 7-6 TPS[1:0]: Capture/Compare/PWM x Timebase Prescale Select bits
   11=1:64 Prescaler
   10=1:16 Prescaler
   01=1:4 Prescaler
   00=1:1 Prescaler bit 5 T32: 32-Bit Timebase Select bit
   1=Uses 32-bit timebase for selected Timer, Single Edge Output Compare, or Input Capture function
   0=Uses 16-bit timebase for selected Timer, Single Edge Output Compare, or Input Capture function
   Note: 32-bit operation not available in dual edge Output Compare modes. bit 4 CCM: Capture/Compare Mode Select bit
   1=Module operates as an Input Capture peripheral 0=Module operates as an Output Compare peripheral
bit 3-0 MOD[3:0]: CCP Mode Select bits
  CCM=1 (Input Capture modes)
  1xxx=Reserved
  0111=Reserved
  0110=Reserved
  0101=Capture every 16th rising edge
  0100=Capture every 4th rising edge
  0011=Capture every rising and falling edge
  0010=Capture every falling edge
  0001=Capture every rising edge
  0000=Capture every rising and falling edge (edge detect mode)
  CCM=0 (Output Compare modes)
  1111=External Input Mode; pulse generator disabled. Source selected by ICS[2:0] bits
  1110=Reserved
  1101=Reserved
  1100=Reserved
  1011=Reserved
  1010=Reserved
  1001=Reserved
  1000=Reserved
  0111=Variable Frequency Pulse Mode
  0110=Center Aligned Pulse Compare Mode—Buffered
  0101=Dual Edge Compare Mode—Buffered
  0100=Dual Edge Compare Mode
  0011=16-Bit/32-Bit Single Edge Mode—Toggle output on compare match
  0010=16-Bit/32-Bit Single Edge Mode—Drive output low on compare match
  0001=16-Bit/32-Bit Single Edge Mode—Drive output high on compare match
  0000=16-Bit/32-Bit Timer Mode—Output functions disabled The following bits of the CCPx control register 2 may provide for the following functionality:
  bit 31 OENSYNC: Output Enable Synchronization bit
    1=Update by output enable bits occurs on the next timebase Reset or rollover
    0=Update by output enable bits occurs immediately
  bit 30 Unimplemented: Read as '0
  bit 29-24 OCxEN: Output Enable/Steering Control bit
    1=OCx pin is controlled by the CCP module and produces Output Compare or PWM signal
    0=OCx pin is not controlled by the CCP module; the pin is available to the port logic or another peripheral multiplexed on the pin
  The Timebase and Input Capture modes may not have any external output pin functions; therefore, the OCxEN bits may not have any effect in these modes (mccp_io_pX_port_en=0). The OCxA-OCxF pins are available to the port logic or another peripheral.
  bit 23-22 ICGSM[1:0]: Input Capture Gating Source Mode Control bits
    11=Reserved
    10=One-shot mode; event from gating source will disable future capture events (ICDIS=1)
    01=One-shot mode; event from gating source will enable future capture events (ICDIS=0)
    00=Level sensitive mode; a high level from gating source will enable future capture events; a low level will disable future capture events
  This bit may have no effect in Timer modes, Output Compare modes, or PWM modes.
  bit 21 Unimplemented: Read as '0'
  bit 20-19 AOUTSEL[1:0]: Auxiliary Output Signal Selection bits
    11=Signal output depends on module operating mode
    10=Signal output depends on module operating mode
    01=Signal output depends on module operating mode
    00=No signal output on mccp_aux_out
  bit 18-16 ICS[2:0]: Input Capture Source Select bits
    111=Capture source #8
    110=Capture source #7
    101=Capture source #6
    100=Capture source #5
    011=Capture source #4
    010=Capture source #3
    001=Capture source #2
    000=Capture source #1
  bit 15 RSEN: CCPx PWM Restart Enable bit
    1=CCPxSTAT.ASE bit clears automatically at the beginning of the next PWM period, after the shutdown input has ended
    0=CCPxSTAT.ASE must be cleared in software to resume PWM activity on output pins
  bit 14 ASDGM: CCPx Auto-Shutdown Gate Mode Enable bit
    1=Wait until next Timebase Reset or rollover for shutdown to occur
    0=Shutdown event occurs immediately
  bit 13 Unimplemented: Read as '0
  bit 12 SSDG: CCPx Software Shutdown/Gate Control bit
    1=Manually force Auto-shutdown, Timer clock gate, or Input Capture signal gate event (setting of ASDGM bit still applies)
    0=Normal module operation
  bit 11-8 Unimplemented: Read as '0
  bit 7:0 ASDG[7:0]: CCPx Auto-Shutdown/Gating Source Enable bits
    1=ASDG source n is enabled
    0=ASDG source n is disabled The following bits of the CCPx control register 3 may provide for the following functionality:
  bit 31 OETRIG: Output Enable on Trigger Control bit
    1=For triggered mode (TRIGEN=1), module does not drive enabled output pins until triggered
    0=Normal output pin operation
  bit 26-24 OSCNT[2:0]: One-Shot Count bits(2)
    111=Extend one-shot trigger event 7 timebase count cycles (8 timebase periods total)
    110=Extend one-shot trigger event 6 timebase count cycles (7 timebase periods total)
    101=Extend one-shot trigger event 5 timebase count cycles (6 timebase periods total)
    100=Extend one-shot trigger event 4 timebase count cycles (5 timebase periods total)
    011=Extend one-shot trigger event 3 timebase count cycles (4 timebase periods total)
    010=Extend one-shot trigger event 2 timebase count cycles (3 timebase periods total)
    001=Extend one-shot trigger event 1 timebase count cycle (2 timebase periods total)
    000=Do not extend one-shot trigger event.
  bit 27 Unimplemented: Read as '0
  bit 26-24 OUTM[2:0]: Output Mode Control bits
    111=Reserved
    110=Output Scan mode
    101=Brush DC output mode, forward
    100=Brush DC output mode, reverse
    011=Reserved
    010=Half-bridge Output mode 001=Push-pull output mode
000=Steerable Single Output mode
bit 23-22 Unimplemented: Read as '0
bit 21 POLACE: CCP Output Pins OCxA, OCxC, and OCxE Polarity Control bit
   1=Output pin polarity is ACTIVE LOW
   0=Output pin polarity is ACTIVE HIGH
bit 20 POLBDF: CCP Output Pins OCxB, OCxD, and OCxF Polarity Control bit
   1=Output pin polarity is ACTIVE LOW
   0=Output pin polarity is ACTIVE HIGH
bit 19-18 PSSACE[1:0]: PWM Output Pins OCxA, OCxC, and OCxE Shutdown State Control bits
   11=Pins are driven ACTIVE when a shutdown event occurs
   10=Pins are driven INACTIVE when a shutdown event occurs
   0x=Pins are tri-stated when a shutdown event occurs
bit 17-16 PSSBDF[1:0]: PWM Output Pins OCxB, OCxD, and OCxF Shutdown State Control bits
   11=Pins are driven ACTIVE when a shutdown event occurs
   10=Pins are driven INACTIVE when a shutdown event occurs
   0x=Pins are tri-stated when a shutdown event occurs
bit 15-6 Unimplemented: Read as '0
bit 5-0 DT[5:0]: Capture/Compare/PWM Deadtime Select bits
   111111=Insert 63 deadtime delay periods between complementary output signals
   000010=Insert 2 deadtime delay periods between complementary output signals
   000001=Insert 1 deadtime delay period between complementary output signals
   000000=Deadtime logic disabled FIG. 6 shows a block diagram of a microcontroller, wherein only essential functions are depicted. A central processing unit (CPU) 260 can be coupled with the programmable timebase 250 for configuration. The timebase 250 can be embodied as shown in FIG. 4. However, the timebase may have additional logic to generate more complex signals as may be required by the peripheral devices. The programmable timebase 250 may receive a plurality of clock signals for selection as well as a plurality of trigger input and/or synchronization signals. As stated above, programmable timebase 250 may generate a wide variety of event signals according to its operating mode. These signals can be provided to respective peripheral devices 210-240 via a dedicated bus or by individual control lines. Depending on the functionality one or more control lines per peripheral unit may be provided. In the example shown in FIG. 6, a capture compare unit 210 is provided which upon receiving a trigger signal can store one or more timer values in an associated FIFO memory. To this end a sequence of trigger signals can be supplied to capture compare unit 210. Alternatively or in combination, a plurality of trigger lines might connect to capture compare unit wherein programmable timebase 250 generates sequential signals on different control lines. Thus, for example, three different timer values could be capture using three separate control signals.

FIG. 6 also shows an analog to digital converter (ADC) unit 220, which may be triggered by the event signal. here, for example, the original trigger signal may be used to start conversion, wherein the event signal generated by the programmable timebase can be used to read the converted value into a FIFO or register.

As another example, FIG. 6 shows a direct memory access (DMA) controller 230 which could be triggered to perform any type of data transfer from memory to a peripheral device or vice versa.

Yet another example shown in FIG. 6 is a pulse width modulation (PWM) unit 240 which could be triggered by one or more event signals generated by the programmable timebase 250.

A module as shown in FIG. 6 may be designed with the following goals in mind:
   Combine timebase, input capture, compare, and PWM functions into a single peripheral to simplify signal routing at the device level.
   Capture the look and feel of the CCP and ECCP modules found on 8-bit products manufactured by the Applicant, but create a peripheral appropriate to the 16-bit and 32-bit general purpose MCU product space.
   Provide functionality similar to the existing Output Compare and Input Capture peripherals found on existing microcontroller devices
   Provide 20 ns or better edge resolution in PWM mode
   Provide the required functionality in the PWM mode to support a selected range of motor control, power supply, and lighting applications.
   Create a universal module that can be applied to all types of microcontrollers.

According to various embodiments, the following functions can be provided:
   Internal timebase and period register
   Input clock prescaler for timebase
   Output trigger for ADC conversions
   Output postscaler for module interrupt events or triggers
   32-bit timebase for selected operating modes
   Timebase Mode
   Capture Modes:
      Feature set similar to icap_v4 module
      16-bit capture of timebase on external event
      4-deep capture buffer
      Capture source input multiplexer
   Output Compare Modes:
      Feature set similar to ocmp_4 module
      Single Edge Compare modes
      Dual Edge Compare modes
      Center Aligned Compare mode
      Variable Frequency Pulse mode
      External Input mode
   Output Control Functions for Output Compare:
      Single Output Steerable mode
      Brush DC Forward and Reverse modes
      Half Bridge with Dead-time Delay
      Push-Pull PWM mode
      Auto-shutdown with programmable source and shutdown state
      Programmable output polarity Multiple instances of the timebase module can be implemented on a device to provide many channels of capture, compare or PWM functionality according to an embodiment. According to another embodiment, PWM output on multiple device output pins can be supported. Hence, the following functions could be realized:
   Deadtime control logic
   Half Bridge, Push-Pull, and Brush DC operating modes
   PWM output steering The advanced PWM feature set may be implemented on a device with two, four, or six output pins to simplify I/O pin multiplexing requirements.

While operating as a trigger, the timer can operate in a One-Shot mode. One-Shot mode is enabled by setting the CCPxCON1.ONESHOT bit. In One-Shot mode, the timer remains in Reset until a trigger event occurs. This event sets the TRIG bit and the timer begins to count. When the timer rolls over to 0000 h, the TRIG bit will be cleared by hardware. This holds the timer in Reset until the next trigger event, creating a one-shot timer.

The CCPxCON3.OSCNT[2:0] control bits allow a one-shot trigger event to be extended for more than one timebase count cycle. This feature is useful, for example, when the module needs to create more than one pulse at a trigger event.

Figure 7:
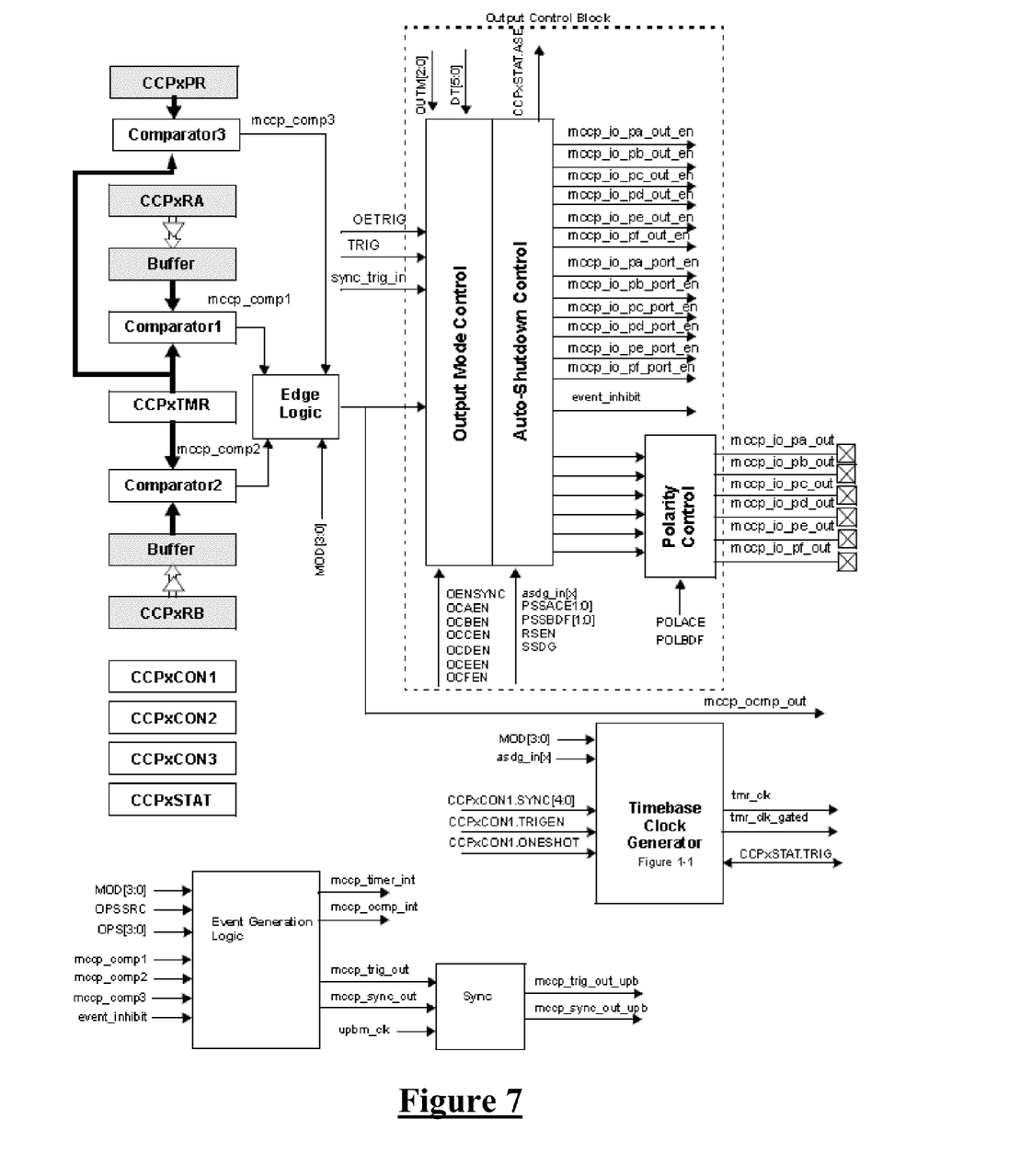
FIG. 7 shows yet another block diagram according to another embodiment.

FIG. 7 shows a typical application of the module timer in a triggered application. In FIG. 7, a trigger event can be generated by another OC module, timer module, IC module, analog comparator, or any other function connected at the top level.

The following operating configurations are possible for triggering the timebase:

1. A trigger signal is received from an external source and the timebase clock source, tmr_clk, is ACTIVE. This is the normal operating configuration of the module. 2. A trigger signal is received from an external source and the timebase clock source, tmr_clk, is INACTIVE. The module must request the timebase clock source before triggered operation can begin. The second configuration may be used when the device is in a low power state. When the trigger is received from the external source, the module will enable the selected clock source for the timebase. When the clock source is available, the module will begin triggered operation. If the module is in the One-shot Trigger mode, the timebase clock source will be disabled when the TRIG status bit is cleared in hardware. The timebase will remain disabled until a new trigger signal is received. This operation lets the module remain in a low power state until it is required. The trigger signal is generated by an external source, or an internal source that operates from a low frequency/low power clock. If SLPEN=1, the module will continue to request the timebase clock source when the device enters Sleep mode.

What is claimed is:

1. A microcontroller comprising a programmable timebase, wherein the timebase comprises a trigger input to start a timer or counter of the timebase and wherein the timebase can be configured to operate in a first mode to generate a plurality of timer/counter event signals until a reset bit in a control register is set and in a second mode to generate a single timer/counter event signal and in a third mode to generate a predefined number of timer/counter event signals, wherein the predefined number is defined by a plurality of bits of a register and wherein the first mode is set by setting a first mode bit and the second mode or the third mode are set by setting a second mode plurality of bits, wherein the control register is a first control register and the plurality of bits are bits of a second control register associated with the timebase.

2. The microcontroller according to claim 1, wherein the first mode bit and second mode plurality of bits are bits of a third control register associated with the timebase.

3. The microcontroller according to claim 2, wherein the third mode is set by setting said second mode bit and setting the plurality of bits to a value >0.

4. The microcontroller according to claim 1, further comprising a capture compare pulse width modulation (CCP) unit or a multiple output CCP (MCCP) unit.

5. The microcontroller according to claim 1, wherein the timebase comprises a comparator coupled with a timebase counter and a period register.

6. The microcontroller according to claim 5, wherein the timebase further comprises a one-shot logic unit operable to control the timebase to generate a single event signal upon receipt of a trigger signal, wherein the event signal is delayed with respect to the trigger signal by a predefined value stored in the period register.

7. The microcontroller according to claim 5, wherein the timebase further comprises a counter operable to control the timebase to generate a predefined number of event signals upon receipt of a trigger signal, wherein each a time period between events is defined by a value stored in the period register and the number of event signals defined by said counter.

8. The microcontroller according to claim 5, further comprising logic to generate a plurality of predefined control signals for each event.

9. A method for generating event signals by means of a timebase in a microcontroller which can operate in at least one of three modes upon receiving a trigger input, comprising:
configuring the timebase for operation in a first mode by setting a first mode bit; configuring the timebase for operation in a second mode or a third mode by setting a second mode plurality of bits; and
when operating in the first mode:
starting a timer or counter of the timebase and generating a plurality of timer/counter event signals until a reset bit in a control register is set;
when operating in the second mode:
generating a single timer/counter event signal;
and when operating in the third mode:
generating a predefined number of timer/counter event signals, wherein the predefined number is defined by a plurality of bits of a register,
wherein the control register is a first control register and the plurality of bits are bits of a second control register associated with the timebase.

10. The method according to claim 9 wherein the third mode is set by setting said second mode bit and setting the plurality of bits to a value >0.

11. The method according to claim 9, wherein the event signal is generated by comparing a value of a timebase counter with a period value stored in a register.

12. The method according to claim 11, wherein the single event signal in the second mode is controlled by a one-shot logic unit operable to control the timebase to generate a single event signal upon receipt of a trigger signal, wherein the event signal is delayed with respect to the trigger signal by a predefined value stored in the period register.

13. The method according to claim 11, wherein a counter counts the number of event signals to limit the generation of event signals.

14. The method according to claim 11, further comprising generating a plurality of predefined control signals for each event.

15. The method according to claim 9, wherein when operating in the third mode, controlling a capture compare unit to store a plurality of capture values.

16. The method according to claim 9, wherein when operating in the third mode, controlling a capacitive time measurement unit to capture a plurality of time measurements.

17. The method according to claim 9, wherein when operating in the third mode, controlling an analog-to-digital converter to store a plurality of converted values.

18. The method according to claim 9, wherein when operating in the third mode, controlling a direct memory access controller to perform a plurality of data transfers.

19. The method according to claim 9, wherein a CPU of the microcontroller is in a low power sleep mode when the time-base generates event signals.

\* \* \* \* \*